United States Patent [19]

Burnell

[11] 4,077,203
[45] Mar. 7, 1978

[54] EMERGENCY METERING VALVE AND GEOMETRY ACTUATOR CONTROL DEVICE

[75] Inventor: Dennis G. A. Burnell, Winsted, Conn.

[73] Assignee: Chandler Evans Inc., West Hartford, Conn.

[21] Appl. No.: 786,989

[22] Filed: Apr. 13, 1977

[51] Int. Cl.² ............... F02C 9/00; F02C 9/08; F02C 9/14
[52] U.S. Cl. ............... 60/39.27; 60/39.09 R; 60/39.28 R; 60/39.29; 60/223
[58] Field of Search ............ 60/39.27, 39.28 R, 39.29, 60/39.09, 223

[56] References Cited

U.S. PATENT DOCUMENTS

| 2,715,814 | 8/1955 | Barr | 60/39.27 X |
|---|---|---|---|
| 3,493,089 | 2/1970 | Haskins | 60/39.28 R |
| 3,719,047 | 3/1973 | Briotet et al. | 60/39.09 R |
| 3,820,323 | 6/1974 | Burnell | 60/39.28 R |
| 3,899,886 | 8/1975 | Swick | 60/39.28 |
| 3,937,588 | 2/1976 | Kisslan | 60/223 |

Primary Examiner—Clarence R. Gordon
Attorney, Agent, or Firm—Radford W. Luther; Richard A. Dornon

[57] ABSTRACT

A manual positioning system for the metering valve and variable geometry actuator of a fuel control has a pair of drive shafts which have engagement structures mounted respectively on their ends for drivingly engaging the metering valve and the cam of the variable geometry actuator. The drive shafts carry gears which are in meshing engagement with a gear carried by a speed setting lever member. Upon the application of a manual control signal, the engagement structures respectively engage the metering valve and the cam such that the lever member may subsequently position these elements.

4 Claims, 4 Drawing Figures

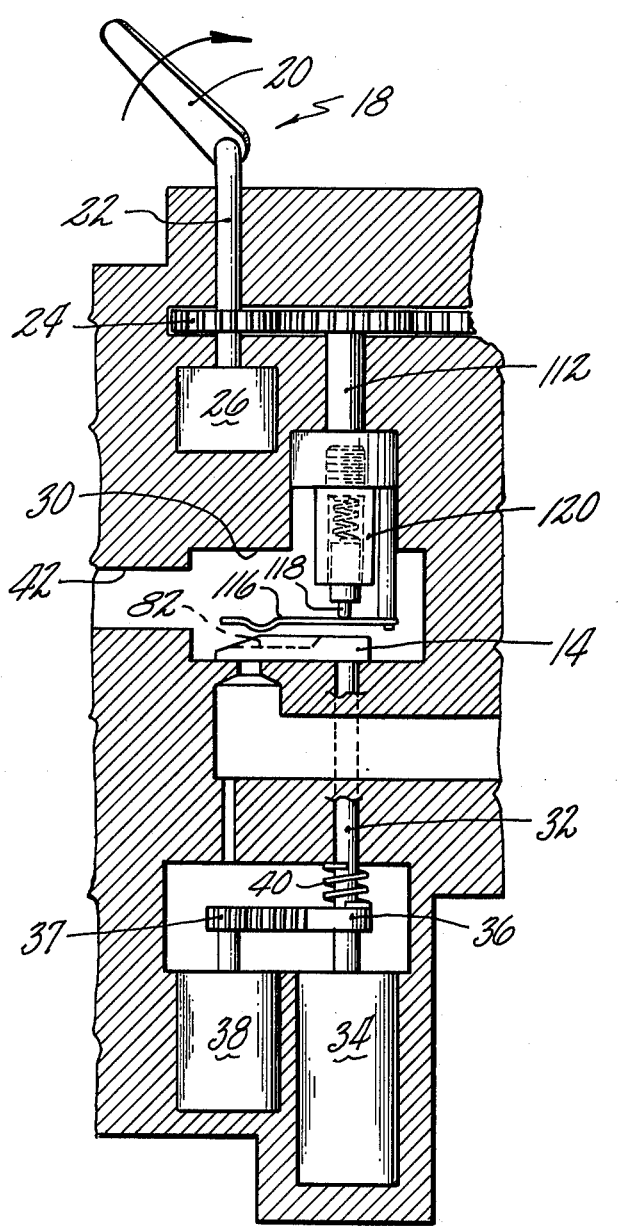
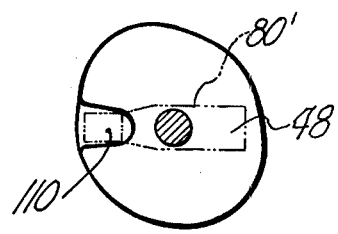
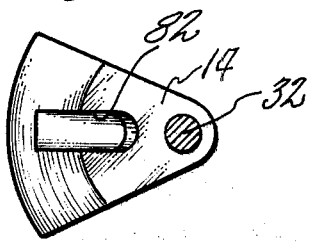

EMERGENCY METERING VALVE AND GEOMETRY ACTUATOR CONTROL DEVICE

BACKGROUND OF THE INVENTION

In the past, certain fuel controls for gas turbine engines have included a means to manually position the metering valve in the event of a failure in the automatic metering valve positioning device, such as shown in U.S. Pat. No. 3,820,323. However, such means have not provided for the simultaneous manual positioning of the variable geometry actuator.

SUMMARY OF THE INVENTION

The invention provides a manual system for simultaneously positioning the metering valve and variable geometry actuator of a fuel control of a gas turbine engine.

In accordance with the invention, a fuel control has a manual positioning system for the fuel metering valve and variable geometry actuator thereof. In brief, a pair of drive shafts, which are in driving connection with the speed setting lever member, carry respective engagement structures adapted to engage the cam member of the variable geometry actuator and the metering valve to permit manual positioning thereof. After the engagement structures establish a driving contact with the metering valve and cam, the later elements may be simultaneously manually positioned by the lever member.

Accordingly, it is a primary object of the invention to provide a manual positioning system for the metering valve and variable geometry actuator of a fuel control.

Another object is to provide a manual means for simultaneously positioning the metering valve and variable geometry actuator of a fuel control.

These and other objects and advantages of the invention will become more readily apparent from the following detailed description, when taken in conjunction with the accompanying drawings, in which:

BRIEF DESCRIPTION OF DRAWINGS

FIG. 2 is a top plan view of the metering valve of FIG. 1.

FIG. 3 is a top plan view of the cam member of FIG. 1.

FIG. 4 is a fragmentary schematic view of another embodiment of the invention.

DETAILED DESCRIPTION OF PREFERRED EMBODIMENT

Figure 1:
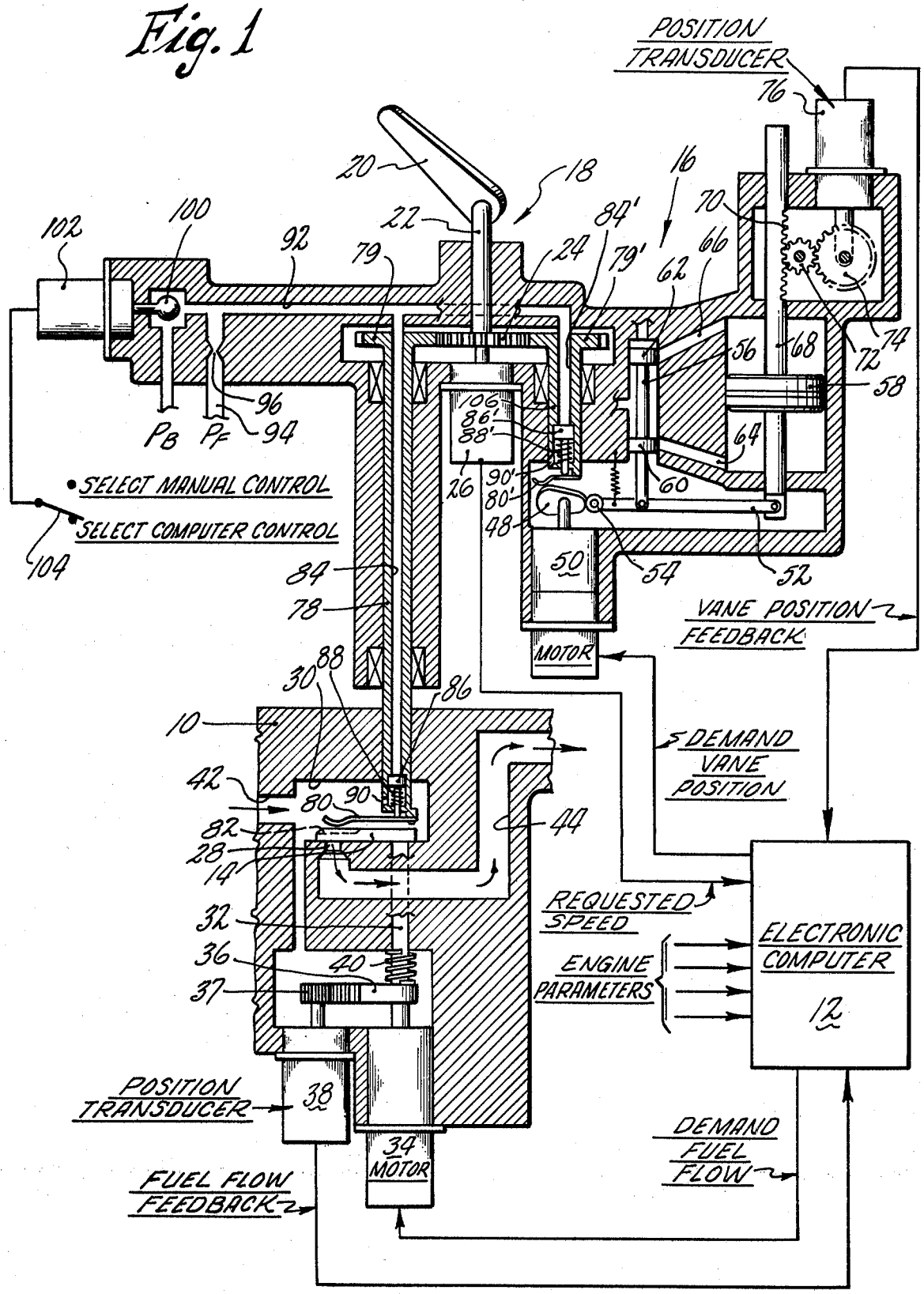
FIG. 1 is a fragmentary schematic view of a fuel control incorporating a preferred embodiment of the invention.

Referring to FIG. 1, there is shown a fuel control incorporating an embodiment of the invention. The fuel control includes the usual plural cavity housing 10 and an electronic computer 12 which senses various engine parameters and furnishes appropriate control signals to various elements in the fuel control. During normal operation of the fuel control, the computer transmits control signals adapted to position a metering valve 14 and a variable geometry actuator, generally indicated at 16.

A speed setting lever member 18 is constituted by a handle 20 and a shaft 22, attached thereto and rotatable thereby. The shaft 22 carries a gear 24 and is operatively connected to a position transducer 26 which furnishes a set or requested speed signal to the computer 12.

The metering valve 14 is a sliding plate type valve, the angular position of which is determinative of the area of a metering opening 28. The metering valve 14 slides over a wall of cavity 30 in which it is mounted when a shaft 32, in driving connection therewith, is turned by a stepping motor 34. A sector gear 36, fixedly secured to the shaft 32 for rotation therewith, is in meshing engagement with a gear 37 carried by the shaft of a position transducer 38, the transducer 38 being adapted to furnish a feedback signal to computer 12 representative of metering valve position. A compression spring 40, interposed between the sector gear 36 and the wall of the cavity in which it is mounted, maintains the lower surface of the metering valve 14 in firm engagement with the wall of the cavity 30. A conduit 42 supplies fuel to the cavity 30 from where it enters the metering orifice 28 and a conduit 44 receives flow traversing the metering orifice 28. A metering head regulator (not shown) is adapted to hold a constant pressure differential across the metering orifice whereby flow therethrough will be essentially a function of the area thereof and hence, valve position.

A variable geometry actuator for controlling the position of the compressor inlet stator vanes (not shown) of the gas turbine engine which is being controlled is shown generally at 16. The actuator 16 comprises a cam member 48 which is rotated by a shaft attached to a stepping motor 50 positioned by a control signal from the computer 12 indicative of a demanded vane position. A follower 54 mounted at its left end in engagement with the cam member 48, provides for positioning a servo valve 56, which, in turn, positions an equal area piston 58. The lands 60 and 62 of the valve 56, which is attached to the follower arm 52, control the flow of hydraulic supply fluid to either side of the piston 58 via ducts 64 and 66. By virtue of the connection between a shaft 68, attached to the piston 58 and the right end of the follower arm 52, movement of the piston repositions the valve 56 in a negative position feedback sense whereby the ducts 64 and 66 are again closed to the ingress or egress of fluid and piston movement is terminated. The upper portion of the shaft 68 has a rack 70 formed thereon which is in meshing engagement with an idler gear 72. The idler gear 72 is, in turn, in engagement with a gear 74 connected to a position transducer 76. The position transducer directs a signal representative of stator vane position to the computer 12. It will be understood that the upper end of the shaft 68 is suitable connected to the engine for positioning the stator vanes.

In the illustrated fuel control, means are provided to manually position the metering valve 14 and the cam member 48 in a simultaneous manner. Such means would, of course, normally be utilized only in the event of a failure in the electronic computer 12. In this regard, it should be noted that the metering valve 14 and cam member 48 are designed to remain in a fixed position should failure occur.

A first drive shaft 78, mounted for rotation within the housing 10, carries a gear 79 in meshing engagement with the gear 24. At the end of the shaft 78 a first engagement structure, in the form of a cantilevered leaf spring 80, is mounted. A downward flexing of the leaf spring causes its end to enter a detent 82 (FIG. 2) in the upper surface of the valve 14 if the spring overlies the detent. If the spring 80 does not overlie the detent, downward flexing of spring 80 will cause the end thereof to hit the upper surface of the valve 14 whereby rotation of the shaft 78 will be necessary to cause the end of the spring 80 to snap into the detent. As shown in FIG. 1, the interior of the first drive shaft 78 defines a conduit 84 with an enlarged diameter portion in which is disposed a piston 86. Piston 86 has an extension which contacts the leaf spring 80. Piston 80 is biased upwardly by a compression spring 88 and is exposed to the pressure in conduit 84 on its upper surface and the pressure in cavity 30 on its lower surface via a passage 90.

Conduit 84 communicates with a pressure signal conduit 92 in housing 10 which, in turn, communicates with a high pressure $P_f$ in conduit 94 via a restriction 96. Conduit 92 also communicates with a low pressure $P_b$ in a conduit 98 via a valve 100 operated by a solenoid 102. When valve 100 is open, as illustrated, low pressure is directed to the piston 86 via conduits 92 and 84, whereby the piston remains in its uppermost position. However, when the valve 100 is closed, as would be occasioned by actuating manual control switch 104 and sending a current through the solenoid 102, high pressure is directed behind the piston 86, thereby causing a downward movement thereof and a consequential downward flexing of the spring 80. It will be appreciated that the actuation of the solenoid could also be effected by a fault isolation circuit incorporated in the computer 12.

A second drive shaft 106 is mounted for rotation in the housing 10 and carries a gear 79' in meshing engagement with the gear 24. The cam member 48 also has a detent 110 (FIG. 3) formed thereupon which is similar to that of the metering valve 14. Similarly, the end of shaft 106 carries an engagement structure in the form of a cantilevered leaf spring 80' and a piston 86' for driving the leaf spring 80' into engagement with the cam member 48. Other similar elements are designated by corresponding primed numerals. Since the conduit 84', which extends through the shaft 106, also communicates with the conduit 92, the piston 86', and hence leaf spring 80, will be driven downwardly when valve 100 is closed.

Upon failure of the computer 12 or other malfunction, switch 104 may be thrown to the manual control position. Thereafter, solenoid 102 closes valve 100 which serves to reference conduit 92 to the high pressure $P_f$. The high pressure $P_f$ drives the pistons 86 and 86' downwardly such that the ends of the springs 80 and 82 engage the upper surfaces of the metering valve 14 and the cam member 48. The lever member 18 is now rotated until the ends of the springs 80 and 80' are received in their respective detents. It should be noted that this reception will probably not occur simultaneously, but that only a small amount of additional lever member rotation will probably be necessary to engage the other detent once one has been engaged. After the ends of both of the springs 80 and 80' respectively engage the detents 82 and 110, the metering valve 14 and the cam member 48 may be manually positioned by the lever member 18 in simultaneous fashion. It will be appreciated that before selection of manual control or after the termination thereof, the springs 80 and 80' in no way interfere with movements of the metering valve 14 and the cam member 48 by the respective stepping motors 34 and 50.

In FIG. 4, wherein elements similar to those of FIG. 1 are designated by like numerals, there is shown a fragmentary view of another embodiment of the invention in which the piston and solenoid valve have been replaced by a solenoid and plunger arrangement. Although the arrangement depicted in FIG. 4 is equally applicable to the cam member, only its relationship to the metering valve will be described. A shaft 112 is mounted for rotation and carries a gear 114 in meshing engagement with the gear 24. Attached at the end of the shaft 112 is an engagement structure in the form of a cantilevered leaf spring 116 adapted to be depressed by the plunger 118 of a solenoid 120 mounted on the shaft 112. In the embodiment of FIG. 4, it will be appreciated that the manual control signal is applied directly to the coil of solenoid 120 to extend the plunger 118.

Obviously many modifications are possible in light of the above teachings without departing from the scope and spirit of the invention, as defined in the following claims:

I claim:

1. In a fuel control for a gas turbine engine with variable geometry stator vanes, the combination comprising:
   a metering valve for controlling fuel flow to the engine;
   a valve driving mechanism operatively connected to the metering valve for positioning the metering valve in accordance with a control signal applied thereto;
   a variable geometry actuator for positioning the vanes, the actuator including a cam member for the control thereof;
   a cam driving mechanism operatively connected to the cam member for positioning the cam member in accordance with a control signal applied thereto;
   an electronic computer, responsive to a plurality of engine parameters, operatively connected to the valve and cam driving mechanisms for applying the respective control signals thereto;
   a lever member for setting a requested speed;
   a transducer operatively connected to the lever member for directing a requested speed signal to the computer;
   a first drive shaft;
   a gear carried by the first drive shaft;
   a second drive shaft;
   a gear carried by the second drive shaft;
   a gear carried by the lever member in meshing engagement with the gears carried by the first and second drive shafts;
   a first engagement structure mounted upon the first drive shaft, the first engagement structure being positionable to drivingly engage the metering valve such that rotaion of the first drive shaft positions the metering valve;
   a second engagement structure mounted upon the second drive shaft, the second engagement structure being positionable to drivingly engage the cam member such that rotation of the second drive shaft positions the cam member; and
   means to drive the first and second engagement structures into respective engagement with the metering valve and the cam member upon application of a manual control signal.

2. The combination of claim 1, wherein the first and second engagement structures each comprise:
   a leaf spring; and wherein the drive means comprises:
   two pistons respectively mounted in the first and second drive shafts; and means to apply a fluid pressure to the pistons sufficient to drive the leaf springs into contact with the metering valve and cam member, respectively.

3. The combination of claim 2, wherein the fluid pressure applying means comprises:
 a fluid passage in each of the drive shafts in communication with the pistons; and
 a solenoid operated valve, responsive to the manual control signal, adapted to increase the fluid pressure in the passages.

4. The combination of claim 1, wherein the drive means comprises:
 a solenoid operated plunger mounted on one of the drive shafts.

* * * * *